United States Patent
Zhang et al.

(10) Patent No.: US 10,518,879 B1
(45) Date of Patent: Dec. 31, 2019

(54) SYSTEM AND METHOD FOR DRIFT-FREE GLOBAL TRAJECTORY ESTIMATION OF A MOBILE PLATFORM

(71) Applicant: HRL Laboratories, LLC, Malibu, CA (US)

(72) Inventors: Lei Zhang, Torrance, CA (US); Deepak Khosla, Camarillo, CA (US); Kyungnam Kim, Oak Park, CA (US); Jiejun Xu, Chino, CA (US); Changsoo S. Jeong, Rancho Palos, CA (US)

(73) Assignee: HRL Laboratories, LLC, Malibu, CA (US)

( * ) Notice: Subject to any disclaimer, the term of this patent is extended or adjusted under 35 U.S.C. 154(b) by 438 days.

(21) Appl. No.: 15/288,622

(22) Filed: Oct. 7, 2016

Related U.S. Application Data

(63) Continuation-in-part of application No. 14/328,402, filed on Jul. 10, 2014.

(Continued)

(51) Int. Cl.
*G06K 9/00* (2006.01)
*B64C 39/02* (2006.01)
(Continued)

(52) U.S. Cl.
CPC ......... *B64C 39/024* (2013.01); *G05D 1/0088* (2013.01); *G05D 1/0246* (2013.01);
(Continued)

(58) Field of Classification Search
CPC ............ G06K 9/00624; G06K 9/0063; G06K 9/00664; G06K 9/00791; G06K 9/46;
(Continued)

(56) References Cited

U.S. PATENT DOCUMENTS 6,024,655 A * 2/2000 Coffee ............... A63B 24/0021
701/472
6,675,074 B2 * 1/2004 Hathout ............... B60K 28/165
701/408

(Continued)

OTHER PUBLICATIONS

Friedrich Fraundorfer et al., "Topological mapping, localization and navigation using image collections", Proceedings of the 2007 International Conference on Intelligent Robots and Systems, Nov. 2007, pp. 3872-3877.*

(Continued)

*Primary Examiner* — Eric Rush
(74) *Attorney, Agent, or Firm* — Tope-McKay & Associates

(57) ABSTRACT

Described is a system for trajectory estimation of a mobile platform, such as a UAV. In operation, the system generates an initial trajectory estimate for the mobile platform which is stored in a trajectory buffer as a buffered trajectory. Images captured at a location are compared with a location recognition database to generate a location label for a current location to designate the current location as a new location or a revisited location. If the location is a revisited location, the system determines if trajectory correction is required. If so, the buffered trajectory is corrected to generate a corrected trajectory as the drift-free trajectory. Finally, the drift-free trajectory can be used in a variety of applications. For example, the drift-free trajectory can be used to cause the mobile platform to traverse a path that coincides with the drift-free trajectory.

24 Claims, 7 Drawing Sheets

Related U.S. Application Data

(60) Provisional application No. 62/239,760, filed on Oct. 9, 2015.

(51) Int. Cl.
```
G05D 1/00      (2006.01)
G08G 5/00      (2006.01)
G06T 7/70      (2017.01)
G05D 1/02      (2006.01)
```

(52) U.S. Cl.
CPC ..... *G06K 9/00664* (2013.01); *G06K 9/00791* (2013.01); *G06T 7/70* (2017.01); *G08G 5/0069* (2013.01); *B64C 2201/141* (2013.01); *G06T 2207/30241* (2013.01)

(58) Field of Classification Search
CPC .. G06K 9/4671; G06K 9/4676; G06K 9/6201; G06K 9/6202; G06K 9/6203; G06K 9/6206; G06K 9/6211; G06K 9/6215; G06F 17/30244; G06F 17/30247; G06F 17/30277; G05D 1/0231; G05D 1/0246; G05D 1/0088; B64C 39/024; B64C 2201/141; G06T 7/70; G06T 2207/30241; G08G 5/0069
USPC ....... 382/100, 103, 104, 153, 181, 190, 209, 382/210, 217, 218, 224, 225, 291, 305, 382/325; 348/113, 114, 116–118; 701/1–3, 28, 400, 408, 409, 450, 461, 701/519, 521–524, 526
See application file for complete search history.

(56) References Cited

U.S. PATENT DOCUMENTS

| | | | |
|---|---|---|---|
| 7,650,013 | B2 | 1/2010 | Dietsch |
| 7,715,979 | B2* | 5/2010 | Dix ........................ A01B 69/008 340/588 |
| 8,180,146 | B2 | 5/2012 | Ngan |
| 8,340,852 | B2* | 12/2012 | Bageshwar .......... G05D 1/0231 701/28 |
| 9,043,072 | B1* | 5/2015 | Tisdale ................. G05D 1/021 701/28 |
| 9,417,072 | B2* | 8/2016 | den Otter ............... G01C 21/06 |
| 9,441,973 | B2* | 9/2016 | Bandyopadhyay ... H04W 64/00 |
| 9,741,140 | B2* | 8/2017 | Birchfield ........... G06K 9/00476 |
| 9,746,327 | B2* | 8/2017 | Hakim ................... G01C 21/12 |
| 2002/0111737 | A1* | 8/2002 | Hoisko .................. G01C 21/20 701/526 |
| 2007/0276541 | A1* | 11/2007 | Sawasaki ............. G05D 1/0246 700/253 |
| 2012/0121161 | A1* | 5/2012 | Eade ..................... G06K 9/2054 382/153 |
| 2012/0306847 | A1* | 12/2012 | Lim ................... G06K 9/00744 345/418 |
| 2013/0288702 | A1 | 10/2013 | Abu-Alqumsan |
| 2013/0332064 | A1* | 12/2013 | Funk ..................... G01C 21/206 701/409 |
| 2013/0338961 | A1* | 12/2013 | Youssef ............... G01C 21/005 702/141 |
| 2014/0010407 | A1 | 1/2014 | Sinha |
| 2015/0281910 | A1* | 10/2015 | Choudhury .......... G01C 22/006 455/456.1 |
| 2015/0304634 | A1* | 10/2015 | Karvounis ......... G06K 9/00201 348/46 |

OTHER PUBLICATIONS

Murillo, A.C., et al., "Localization in Urban Environments Using a Panoramic Gist Descriptor," IEEE Transaction on Robotics, 2013, pp. 146-160.

Liu, Y., et al., "Visual Loop Closure Detection with a Compact Image Descriptor," IEEE International Conference on Intelligent Robots and Systems, 2012, pp. 1051-1056.

Cadena, C., et al., "Robust place recognition with stereo cameras," IEEE International Conference on Intelligent Robots and Systems, 2010, pp. 5182-5189.

Angeli, A., et al., "Fast and incremental method for loop-closure detection using bags of visual words," IEEE Transaction on Robotics, vol. 24, No. 5, 2008, pp. 1027-1037.

Rublee, E., et al., "ORB: An efficient alternative to SIFT or SURF," IEEE International Conference on Computer Vision, 2011, pp. 2564-2571.

Leutenegger, S., et al., "BRISK: Binary Robust Invaritn Scalable Keypoints," IEEE International Conference on Computer Vision, 2011, pp. 2548-2555.

Calonder, M., et al., "BRIEF: Binary Robust Independt Elementary Features," IEEE International Conference on Computer Vision, 2010, pp. 1-14.

Office Action 1 for U.S. Appl. No. 14/328,402 dated Oct. 4, 2016.

Galvez-Lopez, D., et al., "Real-Time Loop Detection with Bags of Binary Words," IEEE International Conference on Intelligent Robots and Systems, Sep. 2011, pp. 51-58.

Response to Office Action 1 for U.S. Appl. No. 14/328,402, dated Jan. 4, 2017.

Office Action 2 for U.S. Appl. No. 14/328,402, dated May 4, 2017.

Michael Calonder, et al., "BRIEF: Computing a Local Binary Descriptor Very Fast," IEEE Transactions on Pattern Analysis and Machine Intelligence, vol. 34, No. 7, Jul. 2012, pp. 1281-1298.

Junqiu Wang, et al., "Coarse-to-fine vision-based localization by indexing scale-invariant features," IEEE Transactions on Systems, Man, and Cybernetics, Part B Cybernetics, vol. 36, No. 2, Apr. 2006, pp. 413-422.

Junjun Wu, et al., "Visual loop closure detection by matching binary visual features using locality sensitive hashing," IEEE, Proceedings of the 11th World Congress on Intelligent Control and Automation, Jul. 4, 2014, pp. 940-945.

H. Strasdat, A.J. Davison, J.M.M. Montiel, and K. Konolige, Double Window Optimization for Constant Time Visual SLAM. In Proceedings of IEEE International Conference on Computer Vision (ICCV), 2011, pp. 2352-2359.

Microsoft (2012). "Kinect for Windows SDK 1.6 Programming Guide". Microsoft. Retrieved Feb. 16, 2013, http://msdn.microsoft.com/en-us/library/microsoft.kinect.depthimageformat.aspx.

Zhenhe Chen, Jagath Samarabandu, Ranga Rodrigo. Recent advances in simultaneous localization and map-building using computer vision. Advanced Robotics, 21(3): pp. 233-265, 2007.

Bill Triggs, Philip F. McLauchlan, Richard I. Hartley, and Andrew W. Fitzgibbon. 1999. Bundle Adjustment—A Modern Synthesis. In Proceedings of the International Workshop on Vision Algorithms: Theory and Practice (ICCV '99), pp. 298-372.

B. Williams, M. Cummins, J. Neira, P. Newman, I. Reid, and J. Tardos, A comparison of loop closing techniques in monocular SLAM. Robotics and Autonomous Systems, 2009, pp. 1188-1197.

M. Cummins and P. Newman. Accelerated appearance-only SLAM. In Proc. IEEE International Conference on Robotics and Automation, 2008, pp. 1828-1833.

Mark Cummins and Paul Newman. Highly Scalable Appearance-Only SLAM—FAB-MAP 2.0. In Robotics Science and Systems, 2009, pp. 1-8.

Dorian Gálvez-López, Juan D. Tardós, Real-Time Loop Detection with Bags of Binary Words, International Conference on Intelligent Robots and Systems, Sep. 2011, pp. 51-58.

M. Kaess, A. Ranganathan, and F. Dellaert, "iSAM: Incremental smoothing and mapping," IEEE Transactions on Robotics (TRO), vol. 24, pp. 1365-1378, Dec. 2008.

R. Kummerle, G. Grisetti, H. Strasdat, K. Konolige, and W. Burgard. g2o: A general framework for graph optimization. In. Proc. of the IEEE Int. Conf. on Robotics and Automation (ICRA), 2011, pp. 3607-3613.

ASUSTeK Computer Inc., Xtion PRO, found at http://www.asus.com/Multimedia/Xtion_PRO/. Downloaded on Dec. 23, 2016.

(56) References Cited

OTHER PUBLICATIONS

IDS Imaging Development Systems, uEye USB2 industrial camera, found at en.ids-imaging.comistore/produkte/kameras/usb-2-0-kameras. html. Downloaded on Dec. 23, 2016.

PrimeSense (2013), Capri depth sensor, found at www.primesense. com/news/primesense-unveils-capri/. Downloaded on Dec. 23, 2016.

Ivan Dryanovski, Roberto G. Valenti, Jizhong Xiao. Fast Visual Odometry and Mapping from RGB-D Data. 2013 International Conference on Robotics and Automation (ICRA2013), pp. 2305-2310.

B. Horn. Closed-form solution of absolute orientation using unit quaternions. Journal of the Optical Society of America, 4(4): pp. 629-642, 1987.

Ondrej Chum (2005). "Two-View Geometry Estimation by Random Sample and Consensus". PhD Thesis, pp. 1-100.

Intel, NUC Kit DC53427HYE, found at www.intel .com/content/ www/us/en/motherboards/desktop-motherboards/desktop-kit-dc. 53427hye_html. Downloaded on Dec. 23, 2016.

Response to Office Action 2 for U.S. Appl. No. 14/328,402, dated Sep. 11, 2017.

Office Action 3 for U.S. Appl. No. 14/328,402, dated Oct. 3, 2017.

Kuipers, B., et al., "A robot exploration and mapping strategy based on a semantic hierarchy of spatial representations," Elsevier, Robotics and Autonomous Systems 8, 1981, pp. 47-63.

Duckett, P., et al., "Fast, On=Line learning of globally consistent maps," Autonomous Robots 12, 2002, pp. 287-300.

\* cited by examiner

SYSTEM AND METHOD FOR DRIFT-FREE GLOBAL TRAJECTORY ESTIMATION OF A MOBILE PLATFORM

CROSS-REFERENCE TO RELATED APPLICATIONS

This is a Continuation-in-Part application of U.S. application Ser. No. 14/328,402, filed on Jul. 10, 2014, and entitled, "Online Location Recognition for Autonomous Robot Exploration," the entirety of which is incorporated herein by reference.

This is ALSO a non-provisional patent application of 62/239,760, filed on Oct. 9, 2015, the entirety of which is hereby incorporated by reference.

GOVERNMENT RIGHTS

This invention was made with government support under U.S. Government Contract Number SYNAPSE HR0011-09-C-0001. The government has certain rights in the invention.

BACKGROUND OF INVENTION

(1) Field of Invention

The present invention relates to a trajectory estimation system and, more specifically, to system for estimating trajectory for motion of an autonomous mobile platform.

(2) Description of Related Art

The application of autonomous mobile platforms, such as unmanned aerial vehicles (UAVs), is a hot research topic in both academia and industry. This is due to their wide range of applications such as autonomous information collection, military monitoring, surveillance, search and rescue, etc. For autonomous navigation, these mobile platforms must have capabilities such as perception, navigation and planning capabilities so that they can explore new and unknown environments autonomously.

Tracking and estimating the mobile platform's moving global trajectory is one necessary capability for task planning and autonomous navigation. Trajectory estimation is typically done by simultaneous localization and mapping (SLAM) techniques. Although there was much advancement in state-of-art SLAM techniques (see the List of Incorporated Literature References, Literature Reference Nos. 1 and 4), SLAM techniques are still prone to errors or inaccuracies. The errors of trajectory estimation can easily accumulate and cause drifting problems, not mentioning other factors such as disturbances from other moving objects that can also cause drifts. Many modern SLAM techniques add additional constraints to reduce drifting problems and correct drifted trajectories. For example, detecting loop closures (i.e., revisiting a previously visited location) adds a loop-closure constraint into the optimization framework and then a typical optimization process called bundle-adjustment (see Literature Reference No. 5) is run to re-estimate all poses of the mobile platform until the current time frame. However, the bundle-adjustment is a computation intensive process and many existing systems have to do it in offline processing, which is not appropriate for a mobile platform that requires light-weight processing and performing online trajectory estimation.

Loop closure detection (see Literature Reference No. 6) is traditionally used in SLAM techniques to add loop-closure constraints and refine the estimated trajectory using some optimization process. Image based loop closure detection is used in some prior works such as that as described in Literature Reference Nos. 7 through 9. Further, location recognition can be used to assist in trajectory estimation. Existing location recognition techniques often require a computation intensive optimization process to re-estimate the mobile platform's poses up to the current time. As noted above, bundle-adjustment (see Literature Reference No. 5) is a typical optimization process that can be used for this purpose. Besides bundle-adjustment, other processes such as graph-based optimization (see Literature Reference Nos. 10 and 11) have also been used. These optimization processes are usually very time-consuming and performed offline.

Thus, a continuing need exists for a trajectory estimation system that requires very little computation, is straightforward, and can be easily implemented onboard embedded processors in a mobile platform.

SUMMARY OF INVENTION

This disclosure provides a system for trajectory estimation of a mobile platform. In some embodiments, the system includes one or more processors and a memory. The memory is a non-transitory computer-readable medium having executable instructions encoded thereon, such that upon execution of the instructions, the one or more processors perform several operations, including generating an initial trajectory estimate for the mobile platform based on sensor data regarding a scene; storing the initial trajectory estimate in a trajectory buffer as a buffered trajectory; and determining if the location is a new location or a revisited location by comparing images captured at a location with a location recognition database (using real-time feature point detection). If the location is determined to be a new location, the coordinates for the new location are stored in the trajectory buffer and the initial trajectory estimate is designated as a drift-free trajectory. Alternatively, if the location is determined to be a revisited location, the system then determines if trajectory correction is required. If trajectory correction is not required, then the initial trajectory estimate is designated as the drift-free trajectory. If trajectory correction is required, the buffered trajectory is corrected to generate a corrected trajectory as the drift-free trajectory.

In another aspect, the system performs an operation of causing a mobile platform to traverse a path that coincides with the drift-free trajectory.

Further, generating the initial trajectory estimate for the mobile platform is performed using a simultaneous localization and mapping (SLAM) module.

Additionally, the sensor data is generated using a sensor system selected from a group consisting of only a monocular camera, only a stereo camera, or a combination of a monocular camera with a depth image sensor.

In another aspect, in determining if trajectory correction is required, trajectory correction is required if a current position of the mobile platform at the location is greater than a predetermined distance threshold from a previously recorded position at the location.

In yet another aspect, in correcting the buffered trajectory to generate a drift-free trajectory, both a latest trajectory segment and a following trajectory segment are corrected, with the following trajectory segment being corrected based on an angle between the latest trajectory segment and corrected trajectory.

Additionally, in correcting the buffered trajectory to generate a corrected trajectory, the corrected trajectory is generated by performing operations of sampling equally-spaced points from a latest trajectory segment in the buffered trajectory; determining corrected positions for each point in the latest trajectory segment; and connecting the corrected positions to form the corrected trajectory.

In another aspect, when the latest trajectory segment is a straight line, the corrected position for each point is determined based on a geometric distance, the geometric distance being a distance from each point to a starting point of the latest trajectory segment.

In yet another aspect, when the latest trajectory segment is a curved line, the corrected position for each point is determined based on a curve distance, the curve distance being a distance from each point to a starting point of the latest trajectory segment along the curved line.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
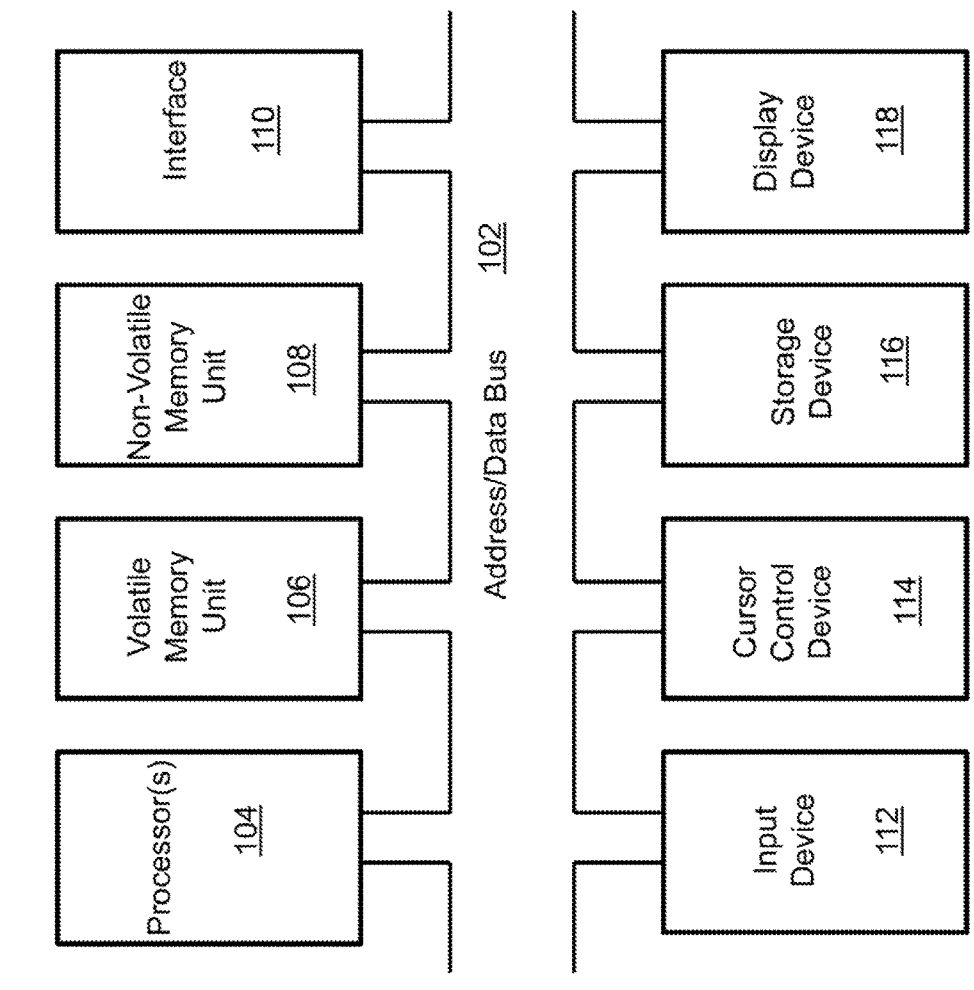
FIG. 1 is a block diagram depicting the components of a system according to various embodiments of the present invention.

The present invention relates to a trajectory estimation system and, more specifically, to system for estimating trajectory for motion of an autonomous mobile platform. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Next, specific details of various embodiment of the present invention are provided to give an understanding of the specific aspects. Finally, an example implementation is provided for further illustration.

(1) LIST OF CITED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number.

1. H. Strasdat, A. J. Davison, J. M. M. Montiel, and K. Konolige, Double Window Optimization for Constant Time Visual SLAM. In Proceedings of IEEE International Conference on Computer Vision (ICCV), 2011.
2. U.S. patent application Ser. No. 14/328,402, filed on Jul. 10, 2014, and entitled, "Online Location Recognition for Autonomous Robot Exploration."
3. Microsoft (2012). "Kinect for Windows SDK 1.6 Programming Guide". Microsoft. Retrieved from Microsoft's website on Feb. 16, 2013.
4. Zhenhe Chen, Jagath Samarabandu, Ranga Rodrigo. Recent advances in simultaneous localization and map-building using computer vision. Advanced Robotics, 21(3):233-265, 2007.
5. Bill Triggs, Philip F. McLauchlan, Richard I. Hartley, and Andrew W. Fitzgibbon. 1999. Bundle Adjustment—A Modern Synthesis. In *Proceedings of the International Workshop on Vision Algorithms: Theory and Practice* (ICCV '99).
6. B. Williams, M. Cummins, J. Neira, P. Newman, I. Reid, and J. Tardos, A comparison of loop closing techniques in monocular SLAM. Robotics and Autonomous Systems, 2009.

7. M. Cummins and P. Newman. Accelerated appearance-only SLAM. In Proc. IEEE International Conference on Robotics and Automation, 2008.
8. Mark Cummins and Paul Newman. Highly Scalable Appearance-Only SLAM—FAB-MAP 2.0. In Robotics Science and Systems, 2009.
9. Dorian Gálvez-López, Juan D. Tardós, Real-Time Loop Detection with Bags of Binary Words, International Conference on Intelligent Robots and Systems, September 2011.
10. M. Kaess, A. Ranganathan, and F. Dellaert, "iSAM: Incremental smoothing and mapping," IEEE Transactions on Robotics (TRO), vol. 24, pp. 1365-1378, December 2008.
11. R. Kummerle, G. Grisetti, H. Strasdat, K. Konolige, and W. Burgard. g2o: A general framework for graph optimization. In Proc. of the IEEE Int. Conf. on Robotics and Automation (ICRA), 2011.
12. Xtion Pro, produced by ASUSTeK Computer Inc.
13. uEye USB2 industrial camera, produced by IDS Imaging Development Systems.
14. Capri depth sensor, produced by PrimeSense in 2013.
15. Ivan Dryanovski, Roberto G. Valenti, Jizhong Xiao. Fast Visual Odometry and Mapping from RGB-D Data. 2013 International Conference on Robotics and Automation (ICRA2013).
16. B. Horn. Closed-form solution of absolute orientation using unit quaternions. Journal of the Optical Society of America, 4(4):629-642, 1987.
17. Ondrej Chum (2005). "Two-View Geometry Estimation by Random Sample and Consensus". PhD Thesis.
18. NUC Kit DC53427HYE, produced by Intel Corporation.

(2) PRINCIPAL ASPECTS

Various embodiments of the invention include three "principal" aspects. The first is a system for trajectory estimation for use on or by a mobile platform (e.g., autonomous robot, unmanned aerial vehicle, etc.). The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and/or command selections to the processor 100. In accordance with one aspect, the input device 112 is an alphanumeric input device, such as a keyboard, that may include alphanumeric and/or function keys. Alternatively, the input device 112 may be an input device other than an alphanumeric input device, such as various sensors or any other hardware or components as may be necessary to implement the process as described herein. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
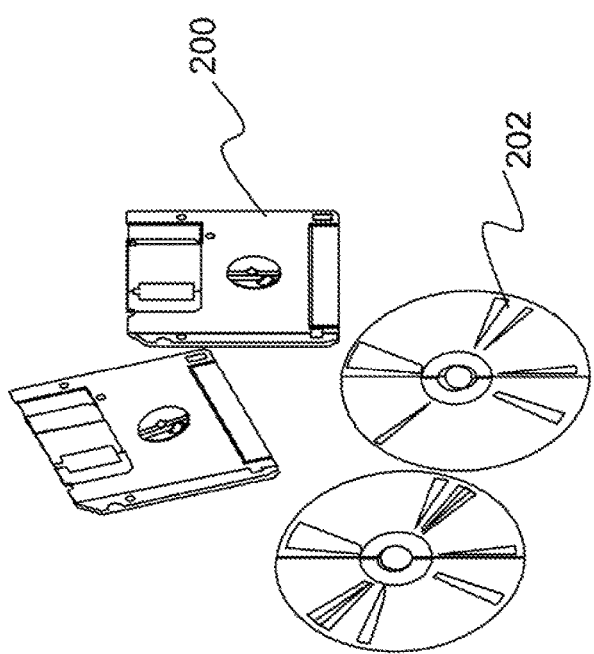
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

The application of autonomous mobile platforms, such as unmanned aerial vehicles (UAVs), is a hot research topic in both academia and industry. This is due to their wide range of applications such as autonomous information collection, military monitoring, surveillance, search and rescue, etc. For autonomous navigation, these mobile platforms must have capabilities such as perception, navigation, planning, etc. Onboard trajectory estimation is an important capability for efficient navigation of unknown environments. State-of-the-art techniques differ in the sensors used, methods for estimating trajectory, and methods for enforcing loop closures and other constraints. Although much advancement has been made on these techniques, many of them are still computationally intensive, requiring large memory or storage, and not suitable for size, weight and power (SWAP)-constrained mobile platforms.

This disclosure improves upon the prior art by providing an efficient drift-free trajectory estimation method and system that can be deployed onboard a mobile platform (e.g., robot, UAV, micro-UAVs, etc.). The system operates by fusing a state-of-the-art visual simultaneous localization and mapping (SLAM) technique (for example, see Literature Reference No. 1) and a location recognition technique (for example, see Literature Reference No. 2) followed by a unique trajectory correction step. As described above, the SLAM trajectory is prone to drift, especially during turning of the mobile platform or disturbance of quick moving targets nearby (e.g., a pedestrian). The system described herein addresses this drift problem by using the location recognition approach followed by a new and efficient trajectory correction technique. Given the system's ability to provide drift-free trajectory estimation, the system can be applied to intelligence, surveillance, and reconnaissance (ISR) systems, UAV applications, autonomous driving or autonomous ground robot navigation, and any other application where an autonomous mobile platform is desired or may be employed. Specific details regarding the various embodiments of the system are provided below.

(4) SPECIFIC DETAILS OF VARIOUS EMBODIMENTS

Figure 3:
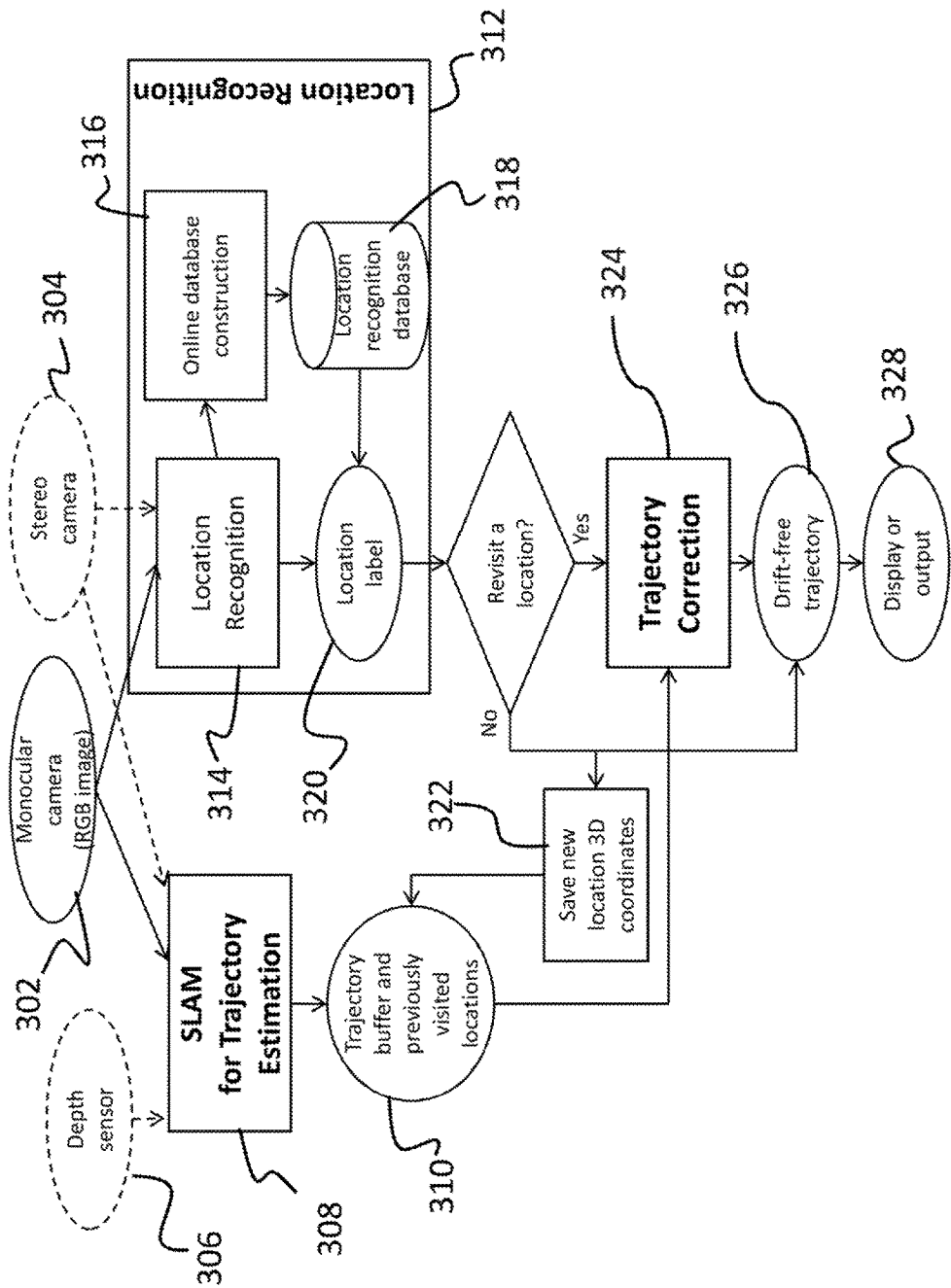
FIG. 3 is a block diagram illustration depicting a process for drift-free trajectory estimation using location recognition according to some embodiments of the present invention.

As shown in the bock diagram of FIG. 3, the system includes several modules that achieve the goal of onboard drift-free trajectory estimation 300 for a mobile platform. The input of the system is sensor data that provides data regarding a scene in front of (or around) the mobile platform. For example, the sensor data can be obtained from a single monocular camera sensor 302, a stereo camera sensor system 304, or multi-sensory that include both monocular camera 302 and a depth image sensor 306 (such as a Microsoft Kinect sensor or LIDAR sensor). Typically, a single sensor system (e.g., monocular camera 302) requires an Inertial Measurement Unit (IMU) sensor for scale estimation and is assumed to be present in the system for these cases. The sensor data (from the cameras 302, 304, and/or sensors 306) is input into a simultaneous localization and mapping (SLAM) module 308 for initial trajectory estimation. Non-limiting examples of sensor combinations that work include (1) a monocular camera 302 only (with IMU), (2) a stereo camera only (with IMU), (3) a monocular camera 302 with a depth image sensor 306, or (4) other combinations or devices.

The output of the SLAM module 308 is stored (e.g., online, onsite, or at any other suitable location) in a trajectory buffer 310. In the meantime, when a location is visited by the mobile platform, an external signal triggers a location recognition module 312 (implementing, for example, the location recognition process as disclosed in Literature Reference No. 2) to recognize the location 314. The location recognition module 312 compares the images captured in this current location within a short period with an online incrementally constructed 316 location recognition database 318 and generates a location label 320 (e.g., as a new location or a revisited place). If the location label 320 is a new one, its 3D coordinates will be saved 322 in the memory (i.e., trajectory buffer 310). If the location is a revisited place, the trajectory correction 324 process will check if correction is needed and if so it will make corrections on the buffered trajectory and generate the drift-free trajectory 326 (otherwise known as the corrected trajectory). The final drift-free trajectory 326 is then output 328 for display and/or usage by other processes such as global navigation and path planning modules. For example, the output 328 (i.e., drift-free trajectory 326) can then be used to cause the mobile platform to travel along or traverse the drift-free trajectory 326 by steering or otherwise navigating (e.g., via a processor and the associated motors, wheels, rotors, etc.) the mobile platform in a path that coincides with the drift-free trajectory 326. Each of the various modules and processes are described in further detail below.

(4.1) SLAM for Trajectory Estimation

As noted above, the system employs a SLAM module 308 for initial trajectory estimation. For initial estimation of the mobile platform's trajectory, any existing SLAM framework can be implemented. As a non-limiting example, the RGB-D version of ScaViSLAM is used for initial trajectory estimation. The ScaViSLAM is described in Literature Reference No. 1 and is incorporated by reference as though fully set forth herein. This SLAM approach requires both a monocular camera (i.e., video camera) and a depth sensor. ScaViSLAM provides a pose optimization framework that has double windows to realize two-level optimization processes. The inner window is connected to a set of softer frame-frame constraints, while the outer window constitutes the larger graph of explored space. In addition, by restricting the number of key frames in the inner window and in the outer window, it can achieve a nearly constant-time operation and maintaining performance similar to the computation intensive offline bundle-adjustment processing. Besides its RGB-D version, ScaViSLAM has been demonstrated to be able to run with only a monocular camera. In addition to ScaViSLAM, other visual SLAM frameworks such as modern techniques (see Literature Reference No. 15) can also be used for initial estimation of the trajectory with various sensor combinations.

Figure 4:
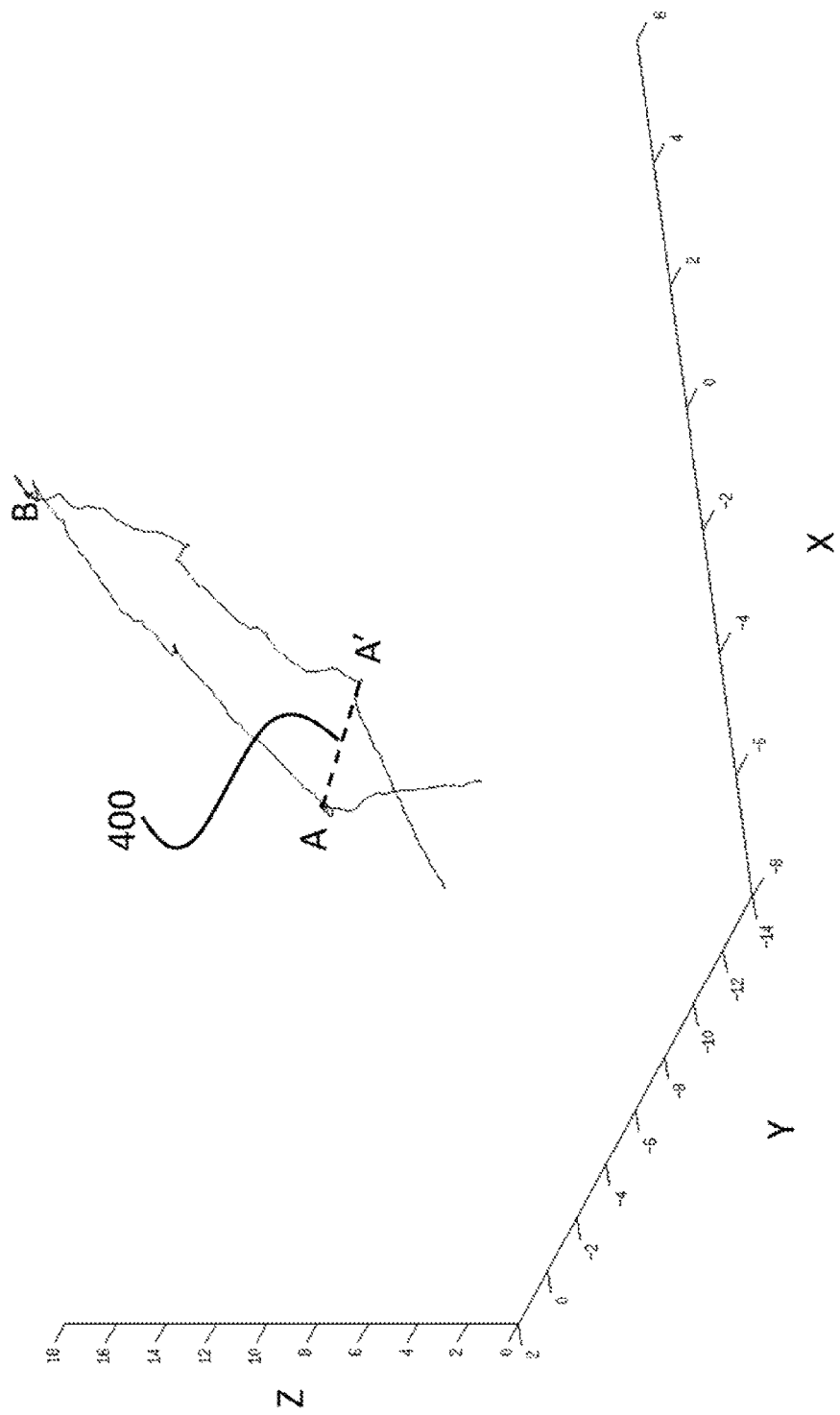
FIG. 4 is an illustration of the drifting problem in SLAM.

The initial trajectory estimated by any SLAM technique is prone to errors and drifting problems. Typically SLAM has difficulty in correctly estimating the trajectory when the mobile platform is turning, when there are not enough feature points in the scene, or when there is another moving object nearby that disturbs the perception process. For example, when the mobile platform is turning a certain degree (e.g., 90 degree), the estimated trajectory is either turning more or less than the actual turning angle. Such errors can gradually accumulate and cause the trajectory drifting problem. FIG. 4 illustrates an example of the drifting phenomenon using actual data with ScaViSLAM. In this simple example, the mobile platform moved from point A to point B along an initial traversal line 400. The mobile platform then tried to move back from point B to point A (for distinction it is labeled as A'). It is clearly shown that point A' deviated (drifted 400) from the initial location A, which is indicated by the dotted line between A and A'. In other words, there is a (slight) drifting problem within this short path. Such problems are usually more significant when the mobile platform is making long path movement, making multiple turns or complex motion.

(4.2) Location Recognition

To solve the above drifting problem, the system adds a location recognition module 312 into SLAM and uses it to find revisited locations and make trajectory correction accordingly. Any suitable location recognition process can be employed. A non-limiting example of such a location recognition process is disclosed in Literature Reference No. 2, which is U.S. patent application Ser. No. 14/328,402 (the '402 application), filed on Jul. 10, 2014, and entitled, "Online Location Recognition for Autonomous Robot Exploration," which is incorporated by reference as though fully set forth herein and describes a process for real-time feature point detection to recognize previously visited locations. The location recognition process as described in the '402 application is based on image-to-image matching using feature descriptors extracted at feature points. First, interesting feature points are detected for each image using a fast feature point detector. Second, a feature descriptor is extracted at each feature point. Third, the feature descriptor is compared to the features stored in the image database for finding a matched feature point. If the pair of feature descriptors is very similar, it is counted as one matched feature point. Fourth, if the total number of matched feature points between two compared images is above a certain threshold, then the two images are declared as representing the same location. Fifth, if within a short period there is enough number of images that match the images taken at a previously visited location, then the mobile platform is recognized as revisiting that location (e.g., the location label designates that the mobile platform is at a revisited location). When a new location is visited, a set of images are captured within a short period and their feature descriptors are stored into the scene database. A location label then designates the location as a new location. In various embodiments, this database is online incrementally updated and therefore there is no need for pre-training.

(4.3) Trajectory Correction

Figure 5:
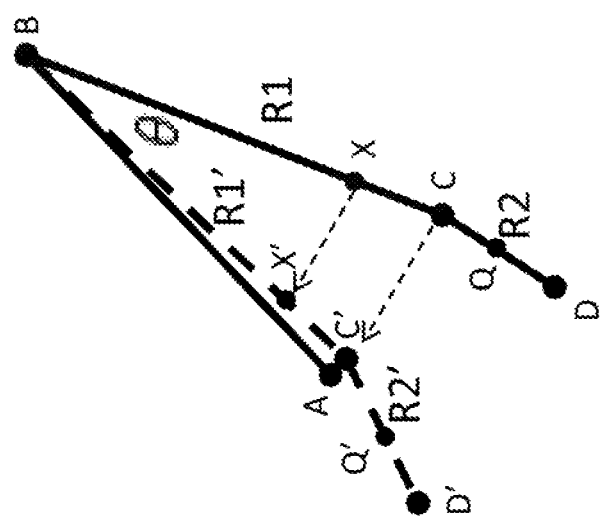
FIG. 5 is an illustration depicting trajectory correction using location recognition.

Once the location recognition module 312 finds a location is revisited, the system performs trajectory correction 324 by checking if the current position is far enough (i.e., beyond a predetermined distance threshold) from previously recorded position for the same location. Far enough to need correction is, for example, one meter, or any other predetermined distance. If the current position is far enough from the previously recorded position, the system will correct the latest trajectory segment since the last visited location (denoted as R1) and the following trajectory segment until another location is visited (denoted as R2). FIG. 5 illustrates the trajectory correction concept using location recognition. The location of point A and point C' should actually be same; however, for illustration purpose, they are drawn a little apart.

In this simple example, the mobile platform moved from location A (corresponding to trajectory point A) to location B and then revisited location A. For distinction the revisiting trajectory point is labeled as point C. There is an apparent drift between point C and point A. Trajectory correction module will correct this drifting problem.

There are at least two ways to correct the trajectory segment R1. For example, let the 3D coordinates of point A and point C be denoted as 3-by-1 vectors $X_A$ and $X_C$ respectively. For any point X in the middle of R1, the system can calculate its geometric distance $L_X$ from the anchor point, i.e., the starting point B of the trajectory R1, as follows:

$$L_X = |X - X_B|_2, \quad (1)$$

where $| \, |_2$ means the L2 norm of a vector. The geometric distance of point C from point B is similarly calculated as $L_{CB}$. The system can also calculate the curve distance $L'_X$ that is defined as the distance from point X to the anchor point B along the curve R1. Assuming the points on R1 are ordered with indices starting from 1 to N and let $I_X$ denote the index for point X. The curve distance $L'_X$ can be calculated by integral, as follows:

$$L'_X = \sum_{i=1}^{I_x} |X_i - X_{i-1}|_2, \quad (2)$$

where $X_0 = X_B$. The curve distance of point C from point B is similarly calculated as $L'_{CB}$.

For trajectory correction of the R1 segment, the basic requirement is that the coordinates of point C after correction (i.e., point C') should be identical as the previously recorded location (i.e., $X_A$). The first way of trajectory correction uses the geometric distance calculated by Equation (1). For the point X, its new coordinate is calculated as follows:

$$X' = X_B + \frac{L_X}{L_{CB}}(X_A - X_B). \quad (3)$$

This correction method is most appropriate when the segment R1 is roughly a straight line.

The second way of trajectory correction uses the curve distance calculated by Equation (2). For the point X, its new coordinate is calculated as follows:

$$X' = X_B + \frac{L'_X}{L'_{CB}}(X_A - X_B). \quad (4)$$

This correction method is better for curvy trajectory.

In other words, the corrected trajectory is generated point by point. Equally-spaced points are first sampled or picked from the buffered trajectory's latest trajectory segment R1 (e.g., using a pre-determined number of points, such as 100). The system cycles through the points. For each point (e.g., point X), the system finds its corrected position (point X') using Equation 3 (straight line) or Equation 4 (curved line). This process is repeated for all points on segment R1. This provides corrected positions of all points from segment R1 (i.e., N corrected points). The system then connects the corrected points to provided corrected trajectory R1'.

Equations 3 and 4 indicate that the system takes the normalized distance (no units since it is a ratio) of each point X on trajectory R1. In the example, this normalized distance is the ratio of $L_X$ (point X to point B) to $L_{CB}$ (point B to point C). For example, assume point X was one meter from point B and the distance between point B and point C is two meters (along line R1). Then this normalized distance=(1 m/2 m)=0.5. The system can then find corresponding corrected position by applying that weighted distance. Then $X'=X_B+$(normalized distance)$*(X_A-XB)=X_B+0.5*(X_B-X_A)$. This process is performed for all points on R1 per above.

Besides correcting the latest trajectory segment R1, the system also corrects the upcoming trajectory R2 after revisiting the previous location A. Since the system has not recognized any newer location yet when R2 is generated, the correction is done by rotating R2 with the same angle as the angle (θ) between the after-correction trajectory R1' and the before-correction trajectory R1. To do so, let Q denotes a point on trajectory R2. Its new coordinate after correction can then be calculated as follows:

$$X'_Q = X'_C + M_\theta * (X_Q - X_C), \quad (5)$$

where $M_\theta$ is the 3D rotation matrix for rotating a unit vector in B→C direction by θ angle to a unit vector in B→C' direction.

This process is primarily useful where the online trajectory correction is slow and lags the trajectory estimator. For example, while the system may be calculating to correct R1, the robot has moved and since it still has not corrected segment R1, the trajectory estimator thinks it is at point D via trajectory R2. This process could also be used for a forensics mode, i.e., the trajectory was generated and then it is being corrected in a post-analysis mode after the robot has come back from a task or mission.

For example, consider an online mode. With a buffered trajectory (and as shown in FIG. 5), the system has finally corrected R1' as the corrected version of R1. In this example, the robot is already at what it thinks is point D. The system then must determine what to we do about previously estimated trajectory R2 from point C onwards. R2 must also be corrected accordingly. The correction is done by rotating R2 with the same angle as the angle (θ) between the after-correction trajectory R1' and the before-correction trajectory R1. This is also done by taking each point on R2 and finding its corrected position per Equation 5 above. Note that is based on angle correction while corrected R1' is based on position correction.

Finally, the above two methods performed well in experiments and can serve the purpose of topological mapping for a mobile platform.

(4.4) Key Frame based Orientation Correction

In the above description for trajectory correction, the system keeps the orientation estimated by SLAM as is and continues trajectory estimation based on that orientation and following estimation updates. In another embodiment of this invention, the system can correct the orientation of the mobile platform simultaneously with trajectory correction. This is done by re-estimating the mobile platform's orientation by comparing the current image frame with respect to those key frames stored when it first visits this location. By comparing two image frames (i.e., the current frame and one of the previous key frame), there is a way to estimate the relative orientation change of the mobile platform. It involves comparing the spatial shifts of matched interest points and calculating the relative transformation through a RANSAC process. An example of a RANSAC process can be found in Literature Reference Nos. 16 and 17. Using multiple key frames for each location, this technique can better estimate the current orientation of the mobile platform. Using the relative transformation between the current frame and the previous nearest key frame, the system can continuously correct the following trajectory with a potential gain of more accuracy. However, this additional process requires more memory and additional computation. As such, this key frame based orientation correction may not be as suitable for mobile platform applications where SWAP is of increased importance.

(5) EXAMPLE IMPLEMENTATION

To demonstrate the effectiveness of the system, the invention was reduced to practice using a monocular camera and a depth sensor. Specifically, both a commercial Kinect sensor (see Literature Reference No. 3) and the Xtion PRO sensor (see Literature Reference No. 12) were used to simultaneously provide both RGB video and depth video streams. Separate sensors were also implemented (uEye camera (see Literature Reference No. 13) and the Capri depth sensor (see Literature Reference No. 14)) to provide synchronized streams as input videos. Other commercial light-weight cameras and depth sensors should be similarly applicable to the described system.

For initial estimation of the mobile platform's trajectory, any existing SLAM framework can be employed. For example, the RGB-D version of ScaViSLAM (see Literature Reference No. 1) was adopted for initial trajectory estimation. This SLAM approach requires both a monocular camera and a depth sensor. Besides its RGB-D version, ScaViSLAM was also demonstrated to be able to run with only a monocular camera.

The above described system was implemented and has been tested on both a laptop (with Intel® Core™ i7-2860QM CPU at 2.5 GHz) and a light-weight computing unit called NUC (next unit of computing) (see Literature Reference No. 18). The NUC has Intel® Core™ i5-3427U processor that is dual core and runs at 1.8 GHz. Its CPU consumes about 17 W energy. With about 2.21b weight (with the case), NUC is appropriate for usage on a mobile platform. As noted above, the tested input sensors included (1) the ASUS Xtion Pro sensor (see Literature Reference No. 12), (2) the Kinect sensor (see Literature Reference No. 3), and (3) an uEye camera (see Literature Reference No. 13) with a Capri sensor (see Literature Reference No. 14). Usually the system achieved 6-10 frames per second (fps) with all processing during live tests using the on-board battery. The range of fps is fluctuating because it also depends on the complexity of the scene. For cluttered scenes where there are a lot of interest feature points, the processing will slow down.

Figure 6:
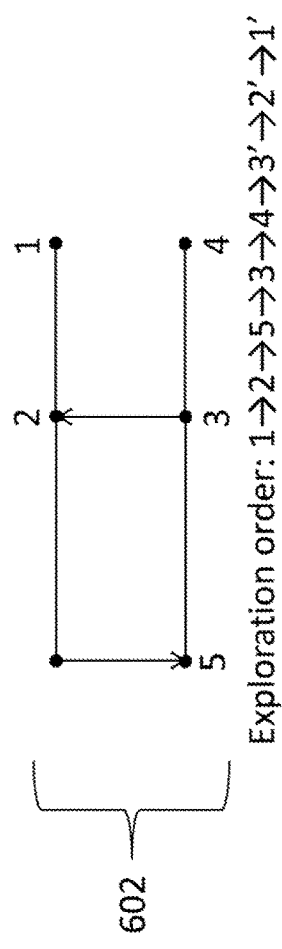
FIG. 6 is an illustration of a testing scenario and the three-dimensional (3D) trajectory estimated by ScaViSLAM without trajectory correction.
Figure 6:
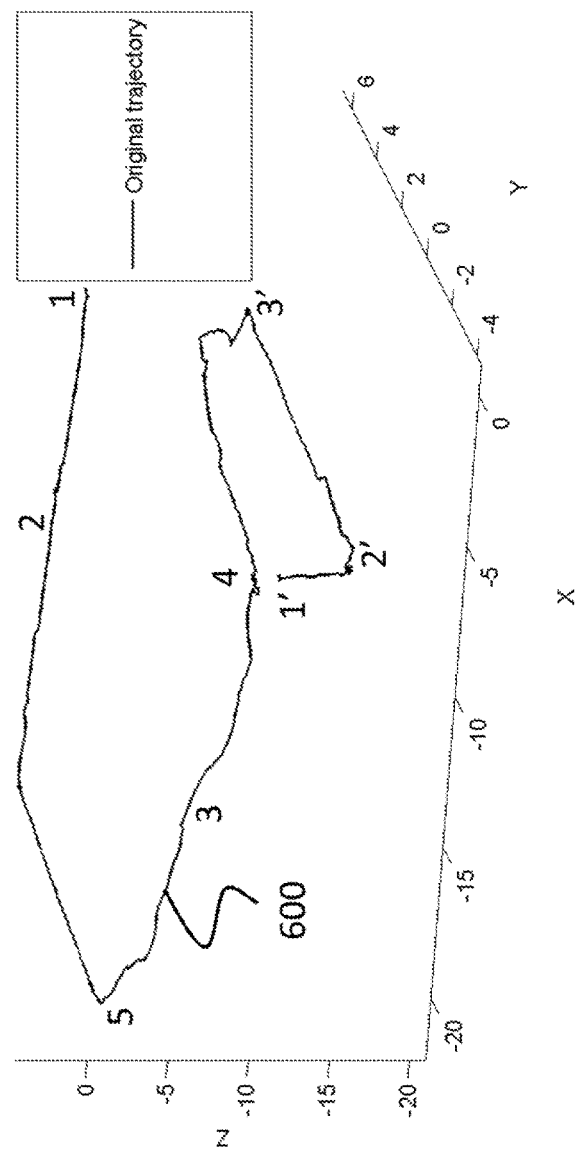
Figure 7:
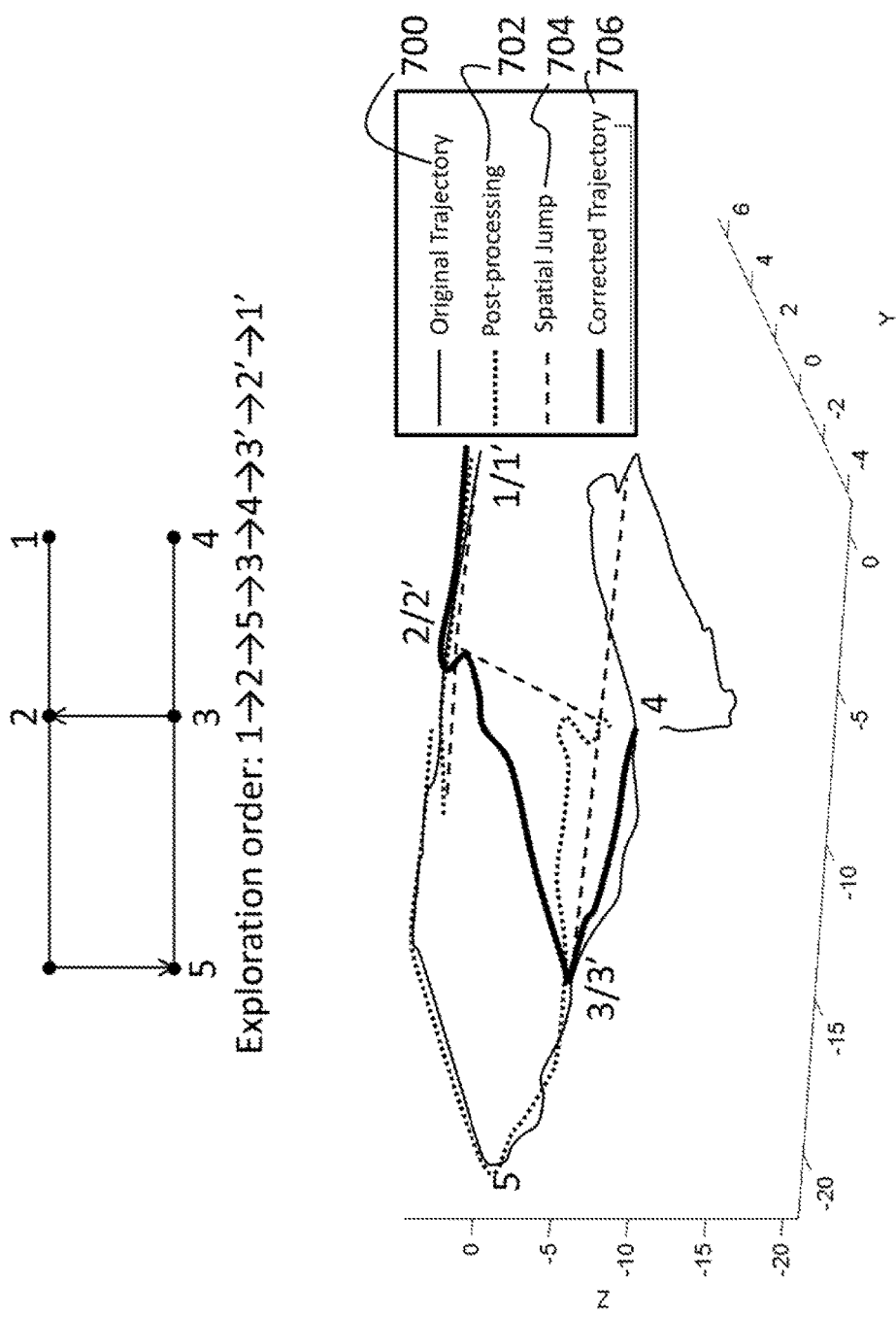
FIG. 7 is an illustration of a testing scenario and the 3D trajectory correction using the system according to some embodiments of the present invention.

For further illustration, live data was collected and the trajectory correction process was redrawn in MATLAB. FIGS. 6 and 7 depict examples of the original and redrawn 3D trajectories. Specifically, FIG. 6 shows the trajectory 600 estimated by ScaViSLAM without using the trajectory correction described in this disclosure. The rough shape of the planned exploration path 602 is illustrated on the top part of FIG. 6. The operator moved the mobile platform from location 1 to locations 2, 5, 3 and 4 sequentially. Then he turned and moved back to revisit location 3. For distinction purpose, the revisited location is labeled as 3'. Similarly the operator further revisited locations 2 and 1, and they are labeled as 2' and 1', respectively. The drifting problem is clearly observed in FIG. 6. For example, when the operator turned and revisited location 3, the estimated trajectory did not go back to location 3. There were apparent orientation errors and probably distance errors. After two more turnings, although the operator revisited locations 2 and 1, the actual trajectory estimated by ScaViSLAM drifted far away in unpredicted manners. Such trajectory could not well represent the actual exploration path and could not be used by other high-level path planning processes.

The technique described in this disclosure was used to address the above described problems. By using the above referenced location recognition technique, the system can detect if a location is revisited. If so, it will correct the trajectory and eliminate the drift between the current 3D position estimation and the previously recorded position when the mobile platform first visited this location. FIG. 7 illustrates the trajectory correction process for the example shown in FIG. 6. In FIG. 7, different lines represents different curves. The solid curve shows the original trajectory 700 estimated by ScaViSLAM, which is identical to the curve shown in FIG. 6. The dotted curve shows the incremental evolution (post-processing) 702 of the trajectory correction process. More specifically, in the path starting from location 1, to locations 2, 5, 3 and 4, there is no location revisiting and therefore no trajectory correction is done. When the mobile platform moved back from location 4 to location 3 (or relabeled as 3' for distinction purpose), the location recognition module recognized location 3 was revisited and triggered the trajectory correction process. The dashed line shows the spatial jump 704 which illustrates that the end point of the dotted curve should be corrected to the position of the other end point on the dashed line. The latest dotted line trajectory up to this point was corrected as the bold corrected trajectory 706 line, which was the trajectory after correction using location recognition. Similarly, when the mobile platform revisited locations 2 and 1, two more corrections were performed, as shown by two other bold corrected trajectory 706 curves. In the end, the system corrected ScaViSLAM's output and achieved a trajectory estimation that well followed the planned navigation path, which was showed on the top part of FIG. 7. The drifting issue was therefore suppressed successfully using the aforementioned technology.

As seen from these results, drift-free trajectory estimation was achieved for the mobile platform. It should be noted that although the term "drift-free" is used, it should be understood that the drift-free trajectory may have some amount of actual drift, so long as the drift is below a predetermined threshold (described above as being when a current location is less than one meter from a previously recorded position for the same location). The experiments demonstrated the efficiency and effectiveness of the described technology that ran well on resource-limited computing units and, as such, is easily integrated with other perception modules and control modules on a UAV for achieving more complex tasks.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for trajectory estimation of a mobile platform, the system comprising:
    one or more processors and a memory, the memory being a non-transitory computer-readable medium having executable instructions encoded thereon, such that upon execution of the instructions, the one or more processors perform operations of:
        generating an initial trajectory estimate for the mobile platform based on sensor data regarding a scene;
        determining if a location is a new location or a revisited location using real-time feature point detection;
        if the location is determined to be a revisited location, determining if trajectory correction is required; and if trajectory correction is required, generating a corrected trajectory as a drift-free trajectory, the corrected trajectory being generated based on a previously recorded position at the location;

wherein in generating the corrected trajectory, the corrected trajectory is generated by performing operations of:

sampling equally-spaced points from a latest trajectory segment in a buffered trajectory;

determining corrected positions for each point in the latest trajectory segment, such that when the latest trajectory segment is a straight line, the corrected position for each point is determined based on a geometric distance, the geometric distance being a distance from each point to a starting point of the latest trajectory segment; and connecting the corrected positions to form the corrected trajectory.

2. The system as set forth in claim 1, further comprising an operation of causing a mobile platform to traverse a path that coincides with the drift-free trajectory.

3. The system as set forth in claim 1, wherein if the location is determined to be a new location, storing coordinates for the new location in a trajectory buffer and designating the initial trajectory estimate as the drift-free trajectory.

4. The system as set forth in claim 1, wherein if trajectory correction is not required, then designating the initial trajectory estimate as the drift-free trajectory.

5. The system as set forth in claim 1, wherein generating the initial trajectory estimate for the mobile platform is performed using a simultaneous localization and mapping (SLAM) module.

6. The system as set forth in claim 1, wherein the sensor data is generated using a sensor system selected from a group consisting of only a monocular camera, only a stereo camera, or a combination of a monocular camera with a depth image sensor.

7. The system as set forth in claim 1, wherein in determining if trajectory correction is required, trajectory correction is required if a current position of the mobile platform at the location is greater than a predetermined distance threshold from a previously recorded position at the location.

8. A system for trajectory estimation of a mobile platform, the system comprising:

one or more processors and a memory, the memory being a non-transitory computer-readable medium having executable instructions encoded thereon, such that upon execution of the instructions, the one or more processors perform operations of:

generating an initial trajectory estimate for the mobile platform based on sensor data regarding a scene;

determining if a location is a new location or a revisited location using real-time feature point detection;

if the location is determined to be a revisited location, determining if trajectory correction is required; and if trajectory correction is required, generating a corrected trajectory as a drift-free trajectory, the corrected trajectory being generated based on a previously recorded position at the location;

wherein in generating the corrected trajectory, the corrected trajectory is generated by performing operations of:

sampling equally-spaced points from a latest trajectory segment in a buffered trajectory;

determining corrected positions for each point in the latest trajectory segment, such that when the latest trajectory segment is a curved line, the corrected position for each point is determined based on a curve distance, the curve distance being a distance from each point to a starting point of the latest trajectory segment along the curved line; and connecting the corrected positions to form the corrected trajectory.

9. A computer program product for trajectory estimation of a mobile platform, the computer program product comprising:

a non-transitory computer-readable medium having executable instructions encoded thereon, such that upon execution of the instructions by one or more processors, the one or more processors perform operations of:

generating an initial trajectory estimate for the mobile platform based on sensor data regarding a scene;

determining if a location is a new location or a revisited location using real-time feature point detection;

if the location is determined to be a revisited location, determining if trajectory correction is required; and if trajectory correction is required, generating a corrected trajectory as a drift-free trajectory, the corrected trajectory being generated based on a previously recorded position at the location;

wherein in generating the corrected trajectory, the corrected trajectory is generated by performing operations of:

sampling equally-spaced points from a latest trajectory segment in a buffered trajectory;

determining corrected positions for each point in the latest trajectory segment, such that when the latest trajectory segment is a straight line, the corrected position for each point is determined based on a geometric distance, the geometric distance being a distance from each point to a starting point of the latest trajectory segment; and connecting the corrected positions to form the corrected trajectory.

10. The computer program product as set forth in claim 9, further comprising instructions for causing a mobile platform to traverse a path that coincides with the drift-free trajectory.

11. The computer program product as set forth in claim 9, wherein if the location is determined to be a new location, storing coordinates for the new location in a trajectory buffer and designating the initial trajectory estimate as the drift-free trajectory.

12. The computer program product as set forth in claim 9, wherein if trajectory correction is not required, then designating the initial trajectory estimate as the drift-free trajectory.

13. The computer program product as set forth in claim 9, wherein generating the initial trajectory estimate for the mobile platform is performed using a simultaneous localization and mapping (SLAM) module.

14. The computer program product as set forth in claim 9, wherein the sensor data is generated using a sensor system selected from a group consisting of only a monocular camera, only a stereo camera, or a combination of a monocular camera with a depth image sensor.

15. The computer program product as set forth in claim 9, wherein in determining if trajectory correction is required, trajectory correction is required if a current position of the mobile platform at the location is greater than a predetermined distance threshold from a previously recorded position at the location.

16. A computer program product for trajectory estimation of a mobile platform, the computer program product comprising:
a non-transitory computer-readable medium having executable instructions encoded thereon, such that upon execution of the instructions by one or more processors, the one or more processors perform operations of:
generating an initial trajectory estimate for the mobile platform based on sensor data regarding a scene;
determining if a location is a new location or a revisited location using real-time feature point detection;
if the location is determined to be a revisited location, determining if trajectory correction is required; and
if trajectory correction is required, generating a corrected trajectory as a drift-free trajectory, the corrected trajectory being generated based on a previously recorded position at the location;
wherein in generating the corrected trajectory, the corrected trajectory is generated by performing operations of:
sampling equally-spaced points from a latest trajectory segment in a buffered trajectory;
determining corrected positions for each point in the latest trajectory segment, such that when the latest trajectory segment is a curved line, the corrected position for each point is determined based on a curve distance, the curve distance being a distance from each point to a starting point of the latest trajectory segment along the curved line; and
connecting the corrected positions to form the corrected trajectory.

17. A computer implemented method for trajectory estimation of a mobile platform, the method comprising an act of:
executing instructions encoded on a non-transitory computer-readable medium, such that upon execution, one or more processors perform operations of:
generating an initial trajectory estimate for the mobile platform based on sensor data regarding a scene;
determining if a location is a new location or a revisited location using real-time feature point detection;
if the location is determined to be a revisited location, determining if trajectory correction is required; and
if trajectory correction is required, generating a corrected trajectory as a drift-free trajectory, the corrected trajectory being generated based on a previously recorded position at the location;
wherein in generating the corrected trajectory, the corrected trajectory is generated by performing operations of:
sampling equally-spaced points from a latest trajectory segment in a buffered trajectory;
determining corrected positions for each point in the latest trajectory segment, such that when the latest trajectory segment is a straight line, the corrected position for each point is determined based on a geometric distance, the geometric distance being a distance from each point to a starting point of the latest trajectory segment; and
connecting the corrected positions to form the corrected trajectory.

18. The method as set forth in claim 17, further comprising an operation of causing a mobile platform to traverse a path that coincides with the drift-free trajectory.

19. The method as set forth in claim 17, wherein if the location is determined to be a new location, storing coordinates for the new location in a trajectory buffer and designating the initial trajectory estimate as the drift-free trajectory.

20. The method as set forth in claim 17, wherein if trajectory correction is not required, then designating the initial trajectory estimate as the drift-free trajectory.

21. The method as set forth in claim 17, wherein generating the initial trajectory estimate for the mobile platform is performed using a simultaneous localization and mapping (SLAM) module.

22. The method as set forth in claim 17, wherein the sensor data is generated using a sensor system selected from a group consisting of only a monocular camera, only a stereo camera, or a combination of a monocular camera with a depth image sensor.

23. The method as set forth in claim 17, wherein in determining if trajectory correction is required, trajectory correction is required if a current position of the mobile platform at the location is greater than a predetermined distance threshold from a previously recorded position at the location.

24. A computer implemented method for trajectory estimation of a mobile platform, the method comprising an act of:
executing instructions encoded on a non-transitory computer-readable medium, such that upon execution, one or more processors perform operations of:
generating an initial trajectory estimate for the mobile platform based on sensor data regarding a scene;
determining if a location is a new location or a revisited location using real-time feature point detection;
if the location is determined to be a revisited location, determining if trajectory correction is required; and
if trajectory correction is required, generating a corrected trajectory as a drift-free trajectory, the corrected trajectory being generated based on a previously recorded position at the location;
wherein in generating the corrected trajectory, the corrected trajectory is generated by performing operations of:
sampling equally-spaced points from a latest trajectory segment in a buffered trajectory;
determining corrected positions for each point in the latest trajectory segment, such that when the latest trajectory segment is a curved line, the corrected position for each point is determined based on a curve distance, the curve distance being a distance from each point to a starting point of the latest trajectory segment along the curved line; and
connecting the corrected positions to form the corrected trajectory.

* * * * *